2,885,429
Patented May 5, 1959

2,885,429

O-BIPHENYLYL O,O-DIALKYL PHOSPHOROTHIOATES

Kenneth C. Kauer and Harold R. Slagh, Midland, Mich., assignors to The Dow Chemical Company, Midland, Mich., a corporation of Delaware No Drawing. Application April 2, 1956
Serial No. 580,428

6 Claims. (Cl. 260—461)

This invention is directed to the O-biphenylyl O,O-dialkyl phosphorothioates having the formula

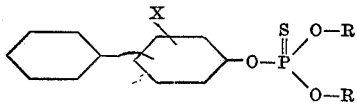

In this and succeeding formulae, X represents hydrogen, bromine, chlorine or lower alkyl and R represents methyl or ethyl. The term "lower alkyl" refers to the alkyl radicals containing from one to four carbon atoms, inclusive. These new compounds are viscous liquids or crystalline solids, somewhat soluble in many organic solvents and of very low solubility in water. The new compounds are useful as plant growth control agents and are adapted to be employed for the control of the growth and killing of weeds and for the sterilization of soil with regard to plant growth. The compounds are also useful as parasiticides and adapted to be employed for the control of mite and insect pests such as aphids and flies.

The new compounds may be prepared by reacting an O-biphenylyl phosphorodichloridothioate of the formula

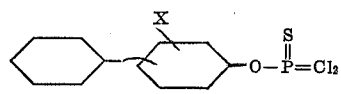

with an alkali metal methylate or an alkali metal ethylate. The alcoholate employed is preferably the sodium salt and may be prepared by reacting methanol or ethanol with sodium in an inert organic solvent and conveniently in an excess of the corresponding alcohol. The reaction is carried out in the presence of an inert organic solvent and conveniently in the alcohol employed in the preparation of the alcoholate. Good results are obtained when employing at least two molecular proportions of the alcoholate with each molecular proportion of the O-biphenyl phosphorodichloroidothioate reagent. The reaction takes place smoothly at the temperature range of from 0° to 60° C., with the formation of the desired product and alkali metal chloride of reaction. The reaction is exothermic and the temperature may be controlled by regulating the rate of contacting the reagents and by external cooling.

In carrying out the reaction, the alkali metal alcoholate is added portionwise to the phosphorodichloridothioate with stirring and at a temperature of 0° to 60° C. Upon completion of the reaction, the solvent is removed from the reaction mixture by evaporation and the residue dissolved in a water immiscible organic solvent such as methylene dichloride, carbon tetrachloride, or benzene. The resultant mixture may be successively washed with water and dilute sodium hydroxide. The separation of the desired product is then accomplished by evaporation of the solvent.

The following examples illustrate the invention but are not to be construed as limiting:

EXAMPLE I

*O-(2-biphenylyl) O,O-dimethyl phosphorothioate*

A quantity of sodium (6.9 grams, 0.3 mole) was dissolved in 80 milliliters of methanol to prepare a methanol solution of the corresponding alcoholate. This solution was added portionwise to 45.5 grams (0.15 mole) of O-(2-biphenylyl) phosphorodichloridothioate over a period of 0.5 hour. The addition was carried out with stirring and cooling and at a temperature of from 10° to 20° C. Following the addition, stirring was continued for 0.5 hour at room temperature to complete the reaction. The methanol was then removed by evaporation and the residue dissolved in benzene. The resulting solution was washed with water and the benzene thereafter removed by evaporation to obtain an O-(2-biphenylyl) O,O-dimethylphosphorothioate product as a liquid residue. This product had a density of 1,221 at 25° C. and a refractive index $n/D$ of 1.5822 at 25° C.

EXAMPLE II

*O-(2-biphenylyl) O,O-diethyl phosphorothioate*

Sodium (0.3 mole) was dissolved in 150 milliliters of ethanol to prepare an ethanol solution of the corresponding alcoholate. This solution was added portionwise to 45.5 grams (0.15 mole) of O-(2-biphenylyl) phosphorodichloridothioate over a period of 0.5 hour. The addition was carried out with stirring and cooling and at a temperature of from 10° to 20° C. Stirring was thereafter continued for one hour at room temperature to complete the reaction. The reaction mixture was thereafter treated as described in Example I to separate an O-(2-biphenylyl) O,O-diethyl phosphorothioate product as a liquid residue. This product had a density of 1,640 at 25° C. and a refractive index $n/D$ of 1.5649 at 25° C.

EXAMPLE III

*O-(4-biphenylyl) O,O-dimethyl phosphorothioate*

Sodium (5.06 grams) was dissolved in 150 liters of methanol to prepare a methanol solution of the corresponding alcoholate. This solution was added portionwise with stirring and cooling to 33.3 grams (0.11 mole) of O-(4-biphenyl) phosphorodichloridothioate dissolved in 100 milliliters of benzene. The addition was carried out over a period of 0.5 hour and at a temperature of from 10° to 20° C. Stirring was thereafter continued for 3 hours at room temperature to complete the reaction. The reaction solvents were then removed by evaporation to obtain an O-(4-biphenylyl) O,O-dimethylphosphorothioate product as a crystalline residue. The latter product was ground in a mortar, the ground product washed with water and thereafter dissolved in benzene and the benzene solution filtered. The benzene was then removed by evaporation and the residue recrystallized from ethanol. This product melted at 118° to 124° C. and had a phosphorus content of 10.51 percent as compared with a theoretical content of 10.54 percent.

EXAMPLE IV

*O-(4-biphenylyl) O,O-diethyl phosphorothioate*

Sodium (5.06 grams) was dissolved in 85 milliliters of ethanol to prepare an ethanol solution of the corresponding alcoholate. This solution was added portionwise with stirring and cooling to 0.11 mole of O-(4-biphenylyl) phosphorodichloridothioate dissolved in 150 milliliters of benzene. The addition was carried out over a period of 0.5 hour and at a temperature of from 25° to 30° C. Stirring was thereafter continued for 3 hours to complete the reaction. The reaction mixture was thereafter treated as described in Example I to separate an O-(4-biphenylyl) O,O-diethyl phosphorothioate product as a liquid residue having a phosphorus content of 9.75 percent and a sulfur content of 9.44 percent.

EXAMPLE V

Sodium (6.9 grams) was dissolved in 100 milliliters of methanol to prepare a methanol solution of the corresponding alcoholate. This solution was contacted with 0.15 mole of O-(3-biphenylyl) phosphorodichloroidothioate in a manner as described in Example II, to obtain an O-(3-biphenylyl) O,O-dimethyl phosphorothioate product. This product was a viscous liquid having a density of 1.218 at 25° C., a refractive index $n/D$ of 1.5899 at 25° C. and a phosphorus content of 10.58 percent as compared to a theoretical content of 10.54 percent.

EXAMPLE VI

In an exactly similar manner sodium ethylate was reacted with O-(3-biphenylyl) phosphorodichloridothioate to obtain an O-(3-biphenylyl) O,O-diethyl phosphorothioate product as a viscous liquid having a density of 1.119 at 25° C. a refractive index $n/D$ of 1.5760 at 25° C. and a phosphorus content of 9.67 percent as compared to a theoretical content of 9.64 percent.

EXAMPLE VII

Sodium (5.52 grams, 0.24 mole) was dissolved in 150 milliliters of methanol to prepare a methanol solution of the corresponding alcoholate. This solution was added portionwise to 43.2 grams (0.12 mole) of O-(4-tertiary-butyl-2-biphenylyl) phosphorodichloridothioate over a period of 0.5 hour. The addition was carried out with stirring and cooling and at a temperature of from 10° to 20° C. The reaction mixture was then processed as described in Example I to obtain an O-(4-tertiary-butyl-2-biphenylyl) O,O-dimethyl phosphorothioate product as a viscous liquid having a density of 1.41 at 25° C. and a refractive index $n/D$ of 1.5648 at 25° C.

EXAMPLE VIII

In a similar fashion sodium ethylate was reacted with O-(4-tertiary-butyl-2-biphenylyl) phosphorodichloridothioate to obtain an O-(4-tertiary-butyl-2-biphenylyl) O,O-diethyl phosphorothioate product as a viscous liquid. This product had a density of 1.111 at 25° C. and a refractive index $n/D$ of 1.5517 at 25° C.

EXAMPLE IX

Sodium (9.2 grams, 0.4 mole) was dissolved in 300 milliliters of methanol to prepare a methanol solution of the corresponding alcoholate. This solution was added slowly portionwise to 67.5 grams (0.2 mole) of O-(2-chloro-4-biphenylyl) phosphorodichloridothioate. This addition was carried out with cooling and stirring and at a temperature of from 10° to 17° C. Following the reaction, the methanol was removed by evaporation to obtain an O-(2-chloro-4-biphenylyl) O,O-dimethyl phosphorothioate product as a crystalline solid. This product was dissolved in a mixture of petroleum ether and benzene, the solvent solution washed with water and thereafter cooled to 2° C. During the cooling the O-(2-chloro-4-biphenylyl) O,O-dimethyl phosphorothioate product crystallized in the solvent mixture and was separated by filtration and found to melt at 61° to 62° C.

EXAMPLE X

In a similar manner sodium ethylate was reacted with O-(2-chloro-4-biphenylyl phosphorodichloridothioate at a temperature of from 10° to 17° C. The ethanol solvent was then removed by evaporating and the residue diluted with benzene and the benzene solution washed with water. The benzene was then removed by evaporation to obtain an O-(2-chloro-4-biphenylyl) O,O-diethyl phosphorothioate product as a viscous liquid having a density of 1.234 at 25° C. and a refractive index $n/D$ of 1.5818 at 25° C.

EXAMPLE XI

Sodium (9.2 grams) was dissolved in 300 milliliters of methanol to prepare a methanol solution of the corresponding alcoholate. This solution was added slowly portionwise to 76 grams (0.2 mole) of O-(2-bromo-4-biphenylyl) phosphorodichloridothioate dissolved in 200 milliliters of methanol. The addition was carried out with cooling and stirring and at a temperature of from 12° to 18° C. Stirring was thereafter continued for 15 minutes at room temperature to complete the reaction. The methanol was then removed by evaporation to obtain an O-(2-bromo-4-biphenylyl) O,O-dimethyl phosphorothioate product as a crystalline solid. This product was dissolved in benzene and the benzene solution washed with water. The benzene solution was then diluted with twice its volume of petroleum ether and cooled to −20° C. During the cooling the phosphorothioate product crystallized and was separated by filtration. This product melted at 64° to 65° C.

EXAMPLE XII

In a similar fashion sodium ethylate was reacted with O - (2-bromo-4-biphenylyl) phosphorodichloroidothioate at a temperature of from 13° to 17° C. The methanol was then removed by evaporation, the residue dissolved in benzene and the benzene solution washed with water. The benzene solution was then fractionally distilled under reduced pressure at temperatures gradually increasing up to 50° C. to obtain an O-(2-bromo-4-biphenylyl) O,O-diethyl phosphorothioate product as a liquid residue. This product had a density of 1.334 at 25° C. and a refractive index $n/D$ of 1.5886 at 25° C.

In a similar manner other O-biphenylyl O,O-dialkyl phosphorothioates may be prepared of which the following are representative.

O-(2-methyl-4-biphenylyl) O,O-dimethyl phosphorothioate by reacting together sodium methylate and O-(2-methyl-4-biphenylyl) phosphorodichloridothioate.

O-(4-chloro-2-biphenylyl) O,O-dimethyl phosphorothioate by reacting together sodium methylate and O-(4-chloro-2-biphenylyl) phosphorodichloridothioate.

O-(4-ethyl-2-biphenylyl) O,O-diethyl phosphorothioate by reacting together sodium ethylate and O-(4-ethyl-2-biphenylyl) phosphorodichloridothioate.

The compounds of the present invention are valuable as parasiticides for the control of insect pests and for the treatment of soil for the control of the growth of seeds and emerging seedlings of many undesirable plant species. For such use, the compounds may be dispersed on a finely divided solid, and employed as dusts. Also, the new products may be employed in oils, as constituents in aqueous emulsions or in aqueous dispersions. In representative operations good controls of the growth of many varieties of seeds and emerging seedlings are obtained with the new phosphorothioate compounds at dosages of 50 pounds per acre.

The O-(biphenylyl) phosphorodichloridothioates employed as starting materials as herein described may be prepared by reacting a molecular excess of phosphorus thiochloride ($PSCl_3$) with an alkali metal salt of a suitable phenyl-phenol. Good results are obtained when employing from two to four moles of phosphorusthiochloride per mole of alkali metal salt. The alkali metal salt, preferably as the sodium salt, is added portionwise with stirring to the phosphorus thiochloride and the mixture subsequently warmed for a period of time to complete the reaction. The reaction mixture is then filtered and the filtrate fractionally distilled under reduced pressure to separate the product.

We claim:
1. An O-biphenylyl O,O-dialkyl phosphorothioate of the formula

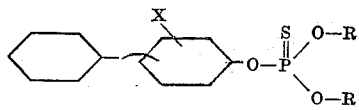

wherein X represents a member of the group consisting of hydrogen, chlorine, bromine and lower-alkyl and R represents a member of the group consisting of methyl and ethyl.

2. O-(2-chloro-4-biphenylyl) O,O-dimethyl phosphorothioate.

3. O-(4-tertiarybutyl-2-biphenylyl) O,O-dimethyl phosphorothioate product.

4. O-(2-biphenylyl) O,O-dimethyl phosphorothioate.

5. O-(4-biphenylyl) O,O-dimethyl phosphorothioate.

6. O-(2-chloro-4-biphenylyl) O,O-diethyl phosphorothioate.

References Cited in the file of this patent

UNITED STATES PATENTS

| | | |
|---|---|---|
| 2,033,918 | Britton | Mar. 17, 1936 |
| 2,506,344 | Cleary | May 2, 1950 |
| 2,520,393 | Fletcher | Aug. 29, 1950 |
| 2,807,637 | Slagh et al. | Sept. 24, 1957 |

FOREIGN PATENTS

| | | |
|---|---|---|
| 257,649 | Switzerland | May 2, 1949 |